Oct. 29, 1929.  J. B. DE COSTA  1,733,336
CONVERTIBLE DRILLING TOOL
Filed March 26, 1928
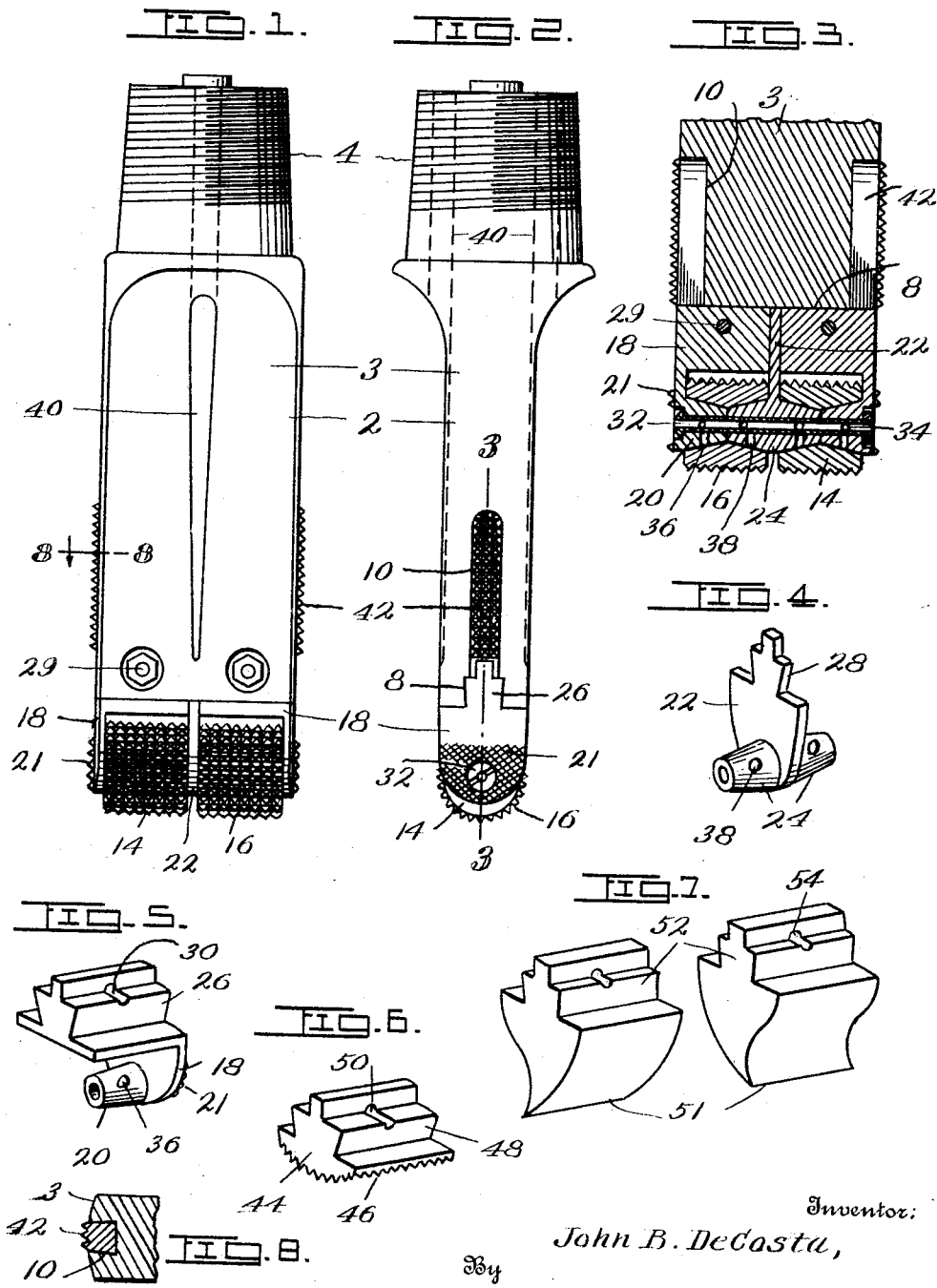

Patented Oct. 29, 1929

1,733,336

UNITED STATES PATENT OFFICE

JOHN B. DE COSTA, OF KANSAS CITY, MISSOURI

CONVERTIBLE DRILLING TOOL

Application filed March 26, 1928. Serial No. 264,661.

My invention relates to improvements in tools for use in rotary drilling systems for oil wells, and pertains more particularly to the bits of said tools which in the present invention are removable in order that new bits may be substituted when the old ones become dulled or worn out.

The invention also relates to a variety of interchangeable bits for drilling in the various formations of earth, shale, rock, etc., encountered in drilling oil and other wells, thus drilling the hole in a shorter time than when only one kind of bit is employed.

One important feature of the invention resides in the fact that the cutting portions of the bits may be tempered to the proper degree of hardness so that they will last much longer and thereby avoid the necessity of pulling the drill stem out of the hole as often as with the old method where the points on the bits must be cut down, sharpened and tempered on the field of operation by a blacksmith, which work can seldom be done properly due to lack of equipment or skill of the blacksmith performing the work.

Another feature is that only one shank with a suitable number and variety of bits is required, whereas heretofore when the shank and bit were integral with each other it has been necessary to have many tools in order that they could be cut down, sharpened and tempered as they were used. It is also necessary to frequently replace fishtail tools that have become too short or worn for further use, thus causing considerable waste in discarding said tools while their upper portions were still in good condition.

Another feature resides in a reaming attachment located on each side of the tool in order that when driling in a hard formation the hole may be drilled and reamed in one operation.

In order that the invention may be fully understood, reference will now be had to the accompanying drawing, in which:

Fig. 1 is a front elevation of a tool made in accordance with the invention.

Fig. 2 is a side elevation of the tool.

Fig. 3 is a broken vertical section on line 3—3 of Fig. 2.

Fig. 4 is a detail perspective view of a central bracket employed in carrying out the invention.

Fig. 5 is a detail perspective view of one of a pair of side brackets.

Fig. 6 is a detail perspective view of one of a pair of bits used in drilling hard formations.

Fig. 7 is a perspective view of a pair of fishtail bits for drilling relatively soft formations.

Fig. 8 is a broken cross section on line 8—8 of Fig. 1.

Referring in detail to the different parts, 2 designates the tool which includes a shank 3 of oblong configuration having the usual tapered and threaded circular upper portion 4 to enter the correspondingly threaded lower end of the drill stem, not shown.

The lower end of the shank 3 is provided with a transverse dovetail groove 8 and two of its side portions with dovetail grooves 10, the lower ends of which communicate with the ends of the transverse groove 8.

14 designates a pair of rotary cutting members or bits provided with peripheral teeth 16 for cutting rock and other hard formations.

18 designates a pair of side brackets provided with tapered stud shafts 20 upon which the rotary cutting members 14 are journaled. The outer surfaces of the brackets 18 are roughened as indicated at 21 for reaming out the hole during the progress of the drilling operation.

22 designates a central bracket provided with a pair of axially aligned reversely-disposed tapered stub shafts 24 upon which the rotary cutting members 14 are mounted.

The upper portions of the side brackets 18 and the central bracket 22 are provided with dovetail tongues 26 and 28, respectively, which are adapted to snugly fit within the groove 8 in which they are removably secured by bolts 29 extending transversely through the lower portion of the shank 3 and holes 30 in the side brackets 18.

32 designates a tubular shaft extending through axial openings in the stub shafts 20 and 24 to prevent the lower portions of the side brackets 18 from spreading apart under the weight thereon while the tool is in operation. The tubular shaft 32 is provided with ports 34 and the tapered shafts 20 and 24 are provided with ports 36 and 38, respectively, through which water may freely circulate to prevent said stub shafts and the rotary cutters 14 from becoming overheated while in operation. The water is forced into the top of the well in the usual manner for flushing out the cuttings at the bottom of the hole, and the shank 3 is provided with longitudinal ducts 40 through which the water may flow in its passage to the bottom of the hole.

42 designates a pair of toothed reamers which are wedge-shaped in cross section to snugly fit within the respective dovetail grooves 10 in two sides of the shank 3.

In practice the foregoing parts may be assembled by first placing the reamers 42 in the dovetail grooves 10, after which one of the side brackets 18 is placed in position in the groove 8 and secured by its respective bolt 29. One of the rotary cutters 14 is then slipped in position upon the stub shaft 20 of said side bracket 18, after which the central bracket 22, the companion cutter 14, and the other side bracket 18 are slipped into the groove 8 in the order named and secured by the other bolt 29. The tubular bolt 32 is then placed in position in the axially aligned bores of the tapered stub shafts 20 and 24 to prevent the lower portions of the side brackets 18 from spreading apart as hereinbefore stated. When the parts are assembled as set forth the side brackets 18 reliably hold the central bracket 22 and the reamers 42 in place.

In operation, as the shank 3 is rotated the cutters 14 rotate therewith and also rotate upon their own axes so that wear on the teeth 16 will be uniformly distributed. The cutters 14 also, owing to their outer ends describing a greater circle than their inner ends when rotated with the shank 3, partially drag or rotate axially at a lower speed than the speed of the shank 3 and thus exert a grinding as well as a cutting action on the hard rock formation upon which they are adapted to operate. As the rotary cutters 14 deepen the hole the reamers 42 coact with the roughened surfaces 21 on the brackets 18 in keeping the hole at substantially a uniform diameter.

Fig. 6 discloses one of a pair of cutters 44 which may be substituted for the rotary cutters 14 when semi-hard material such as shale or sandstone is encountered. Each bit 44 has a curved bottom portion provided with teeth 46, and an upper portion with a dovetail tongue 48 adapted to fit into the groove 8 in the shank 3 after the brackets 18 and 22 have been removed. Each tongue 48 has a transverse hole 50 so that the bits 44 may be firmly held in the groove 8 by means of the bolts 29.

Fig. 7 shows a pair of fishtail bits which may be employed to advantage in drilling the softer formations in which the bits 14 and 44 are not required. Each fishtail bit has a cutting edge 51 and a dovetail tongue 52, which latter is adapted to fit snugly in the groove 8 and is provided with a hole 54 for the bolt 29 whereby said tongue is reliably secured in said groove 8.

From the foregoing description it is apparent that I have provided a drilling tool with a variety of interchangeable bits for efficient operation in the different formations encountered when drilling wells, and while I have shown several forms of bits I reserve all rights to such other forms as properly fall within the spirit and scope of the invention as claimed.

Having thus described my invention, what I claim and desire to secure by Letters Patent, is:

A device of the character described consisting of a shank having a groove extending entirely across its under side, a central bracket having a tongue at its upper end adapted to enter and be positioned midway between the ends of the groove, bearings projecting in opposite directions from the lower end of said bracket, a pair of side brackets having tongues at their upper ends for entering said groove and abutting the opposite sides of the tongue on the central bracket, bearings on the lower ends of said side brackets adapted to abut the adjacent ends of the bearings on the central bracket, means for removably securing said brackets in place, and a pair of rotary cutters journaled upon said bearings.

In testimony whereof I affix my signature.

JOHN B. DE COSTA.